United States Patent
Vandame et al.

(10) Patent No.: US 9,807,368 B2
(45) Date of Patent: Oct. 31, 2017

(54) PLENOPTIC CAMERA COMPRISING A SHUFFLED COLOR FILTER ARRAY

(71) Applicant: THOMSON LICENSING, Issy les Moulineaux (FR)

(72) Inventors: Benoit Vandame, Betton (FR); Mathilde Brossard, Larajasse (FR); Valter Drazic, Betton (FR)

(73) Assignee: Thomson Licensing, Issy-les-Moulineaux (FR)

( * ) Notice: Subject to any disclaimer, the term of this patent is extended or adjusted under 35 U.S.C. 154(b) by 0 days.

(21) Appl. No.: 15/236,470

(22) Filed: Aug. 14, 2016

(65) Prior Publication Data

US 2017/0048513 A1     Feb. 16, 2017

(30) Foreign Application Priority Data

Aug. 14, 2015   (EP) ..................................... 15306297

(51) Int. Cl.
*H04N 13/02* (2006.01)
*G06T 7/557* (2017.01)
(Continued)

(52) U.S. Cl.
CPC ....... *H04N 13/0232* (2013.01); *G02B 3/0056* (2013.01); *G02B 5/201* (2013.01);
(Continued)

(58) Field of Classification Search
CPC ............ H04N 13/0282; G06T 2200/21; G06T 2207/10052; G06T 7/557
See application file for complete search history.

(56) References Cited

U.S. PATENT DOCUMENTS

| 8,054,352 B2* | 11/2011 | Kim | ...................... H04N 9/045 348/280 |
| 8,345,144 B1* | 1/2013 | Georgiev | ............... G03B 11/00 348/335 |

(Continued)

FOREIGN PATENT DOCUMENTS

| GB | 2488905 | 9/2012 |
| GB | 2505954 | 3/2014 |

(Continued)

OTHER PUBLICATIONS

Vandame et al., "Plenoptic Refocusing With Aberration Corrections", Invention Submission, May 13, 2015, pp. 1-15.

(Continued)

*Primary Examiner* — Lin Ye
*Assistant Examiner* — Chriss Yoder, III
(74) *Attorney, Agent, or Firm* — Myers Wolin LLC

(57) ABSTRACT

A plenoptic camera is proposed having a color filter array positioned on an image sensor with an array of pixels, the color filter array having a first filter with a set of unit elements, each unit element covering M×M pixels of the image sensor, with M an integer such that M≥2. The plenoptic camera further includes a set of micro-lens, each micro-lens delivering a micro-lens image on the image sensor with a diameter equal to p=k×M, with k being an integer greater than or equal to two. The first filter is remarkable in that the set of unit elements comprises an initialization unit element being associated with a matrix $$(c_{m,n})_{\substack{0 \le m < M \\ 0 \le n < M}}$$

indicating a filter repartition (or pattern), where each coefficient $c_{m,n}$ is associated with a filter value, and in that the (Continued)

other unit elements are associated with matrixes with coefficients set to $c_{(x+i)modM,(y+j)modM}$, for corresponding pixel (x,y,i,j) on the image sensor, where indexes x, y relate to indexation of a pixel in the image sensor, and indexes i,j relate to indexation of a micro-lens in the set of micro-lens.

12 Claims, 11 Drawing Sheets (51) Int. Cl.
- *G06T 3/40* (2006.01)
- *G02B 3/00* (2006.01)
- *G02B 5/20* (2006.01)

(52) U.S. Cl.
CPC ............ *G06T 3/4015* (2013.01); *G06T 7/557* (2017.01); *H04N 13/0207* (2013.01); *H04N 13/0257* (2013.01)

(56) References Cited

U.S. PATENT DOCUMENTS

| | | | |
|---|---|---|---|
| 8,456,552 B2 | 6/2013 | Tajiri | |
| 8,471,920 B2 | 6/2013 | Georgiev et al. | |
| 8,804,015 B2* | 8/2014 | Hayashi | H04N 9/045 348/273 |
| 2009/0027527 A1* | 1/2009 | Pang | H01L 27/14627 348/280 |
| 2009/0128658 A1 | 5/2009 | Hayasaka et al. | |
| 2010/0238330 A1 | 9/2010 | Hirota | |
| 2013/0107085 A1 | 5/2013 | Ng et al. | |
| 2014/0146201 A1 | 5/2014 | Knight et al. | |
| 2015/0092071 A1 | 4/2015 | Meng et al. | |
| 2015/0109498 A1* | 4/2015 | Aoki | H04N 5/345 348/280 |
| 2015/0215593 A1 | 7/2015 | Sambongi | |

FOREIGN PATENT DOCUMENTS

| | | |
|---|---|---|
| WO | WO2012117691 | 9/2012 |
| WO | WO2014164909 | 10/2014 |
| WO | WO2015093332 | 6/2015 |

OTHER PUBLICATIONS

Ng et al., "Digital Correction of Lens Aberrations in Light Field Photography", SPIE International Optical Design Conference, Vancouver, British Columbia, Canada, Jul. 18, 2006, pp. 1-14.

Yu et al., "An Analysis of Color Demosaicing in Plenoptic Cameras", IEEE Conference on Computer Vision and Pattern Recognition, Providence, Rhode Island, USA, Jun. 16, 2012, pp. 1-9.

Georgiev et al., "Superresolution With the Focused Plenoptic Camera", SPIE Conference on Computational Imaging IX, San Francisco, California, USA, Jan. 23, 2011, pp. 1-13.

Merklinger, "A Technical View of Bokeh", Photo Techniques, May/Jun. 1997, pp. 1-5.

Nasse, "Depth of Field and Bokeh", Zeiss Company, Camera Lens Division, Mar. 2010, pp. 1-45.

Bishop et al., "The Light Field Camera: Extended Depth of Field, Aliasing, and Superresolution", IEEE Transactions on Pattern Analysis and Machine Intelligence, vol. 34, No. 5, May 2012, pp. 972-986.

Anonymous, "Bilinear interpolation", Wikipédia, http://en.wikipedia.org/wiki/Bilinear_interpolation, Nov. 21, 2015, pp. 1-3.

* cited by examiner

p = 2 and M = 2

FIG. 5(b)

$p = 2$ and $M = 2$

FIG. 6(a)

$p = 4$ and $M = 2$ $p = 4 = 2M$

FIG. 6(b)

$p = 4$ and $M = 2$ $p = 4 = 2M$ $$c_{0,0}\ c_{0,1}\ c_{0,2}\ c_{0,1}\ c_{0,2}\ c_{0,0}\ c_{0,2}\ c_{0,0}\ c_{0,1}$$
$$c_{1,0}\ c_{1,1}\ c_{1,2}\ c_{1,1}\ c_{1,2}\ c_{1,0}\ c_{1,2}\ c_{1,0}\ c_{1,1}$$
$$c_{2,0}\ c_{2,1}\ c_{2,2}\ c_{2,1}\ c_{2,2}\ c_{2,0}\ c_{2,2}\ c_{2,0}\ c_{2,1}$$
$$c_{1,0}\ c_{1,1}\ c_{1,2}\ c_{1,1}\ c_{1,2}\ c_{1,0}\ c_{1,2}\ c_{1,0}\ c_{1,1}$$
$$c_{2,0}\ c_{2,1}\ c_{2,2}\ c_{2,1}\ c_{2,2}\ c_{2,0}\ c_{2,2}\ c_{2,0}\ c_{2,1}$$
$$c_{0,0}\ c_{0,1}\ c_{0,2}\ c_{0,1}\ c_{0,2}\ c_{0,0}\ c_{0,2}\ c_{0,0}\ c_{0,1}$$
$$c_{2,0}\ c_{2,1}\ c_{2,2}\ c_{2,1}\ c_{2,2}\ c_{2,0}\ c_{2,2}\ c_{2,0}\ c_{2,1}$$
$$c_{0,0}\ c_{0,1}\ c_{0,2}\ c_{0,1}\ c_{0,2}\ c_{0,0}\ c_{0,2}\ c_{0,0}\ c_{0,1}$$
$$c_{1,0}\ c_{1,1}\ c_{1,2}\ c_{1,1}\ c_{1,2}\ c_{1,0}\ c_{1,2}\ c_{1,0}\ c_{1,1}$$

PLENOPTIC CAMERA COMPRISING A SHUFFLED COLOR FILTER ARRAY

This application claims the benefit, under 35 U.S.C. §119 of European Patent Application No. 15306297.1, filed Aug. 14, 2015.

TECHNICAL FIELD

The disclosure relates to color filter array used in plenoptic camera. More precisely, the disclosure relates to a technique for avoiding color artifacts when refocusing is done, especially when bokeh is present in images.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Even with plenoptic cameras, blur in some out-of-focus parts of an image still remain (and it is not possible to focus on in this places) due to the fact that these out-of-focus parts correspond to elements in the object space that are far from the focalization distance. In conventional photography, this blur is also named bokeh. As specified in Wikipedia for bokeh: "In out-of-focus areas, each point of light becomes an image of the aperture, generally a more or less round disc. Depending how a lens is corrected for spherical aberration, the disc may be uniformly illuminated, brighter near the edge, or brighter near the center. Lenses that are poorly corrected for spherical aberration will show one kind of disc for out-of-focus points in front of the plane of focus, and a different kind for points behind. This may actually be desirable, as blur circles that are dimmer near the edges produce less-defined shapes which blend smoothly with the surrounding image. The shape of the aperture has an influence on the subjective quality of bokeh as well. For conventional lens designs (with bladed apertures), when a lens is stopped down smaller than its maximum aperture size (minimum f-number), out-of-focus points are blurred into the polygonal shape formed by the aperture blades."

It should be noted that "high quality" bokeh is viewed by most photographers as out of focus areas that are smooth rather than harsh. Moreover, in case of a color image, the quality of bokeh is linked to the homogeneity of colors in out-of-focus part of the image (i.e. without color artifacts). More details on Bokeh are described in the article entitled "*A Technical View of Bokeh*" by Harold M. Merklinger in Photo Techniques, May/June 1997, or in the technical note: "*Depth of Field and Bokeh*" by H. H. Nasse from the Camera Lens Division of the Zeiss company.

The obtaining of color images from a plenoptic camera (as the one depicted in FIG. 1) generally involves a color demosaicing process that consists in determining, for each pixel of the image sensor, the two color channel representations that have not been recorded by the pixel (i.e. the missing colors). Indeed, as for traditional digital cameras, a plenoptic camera comprises a color filter array (noted CFA) placed onto the image sensor so that each pixel only samples one of the three primary color values. Such Color Filter Array is usually a Bayer type CFA which is the repetition of a Bayer pattern that can be represented as a matrix $$A = (a_{ij})_{\substack{0 \leq i \leq 1 \\ 0 \leq j \leq 1}},$$

with 2 lines and 2 column, where $a_{00}=a_{11}=G$ (for Green), $a_{01}=R$ (for Red), and $a_{10}=B$ (for Blue). For example, the FIG. 18B of document US 2014/0146201 presents an image sensor recovered by a Color Filter array with the repetition of such Bayer pattern. Another Bayer pattern is represented by a matrix $$B = (b_{ij})_{\substack{0 \leq i \leq 1 \\ 0 \leq j \leq 1}},$$

with 2 lines and 2 column, where $b_{01}=b_{10}=G$ (for Green), $b_{00}=R$ (for Red), and $b_{11}=B$ (for Blue).

Figure 3A:
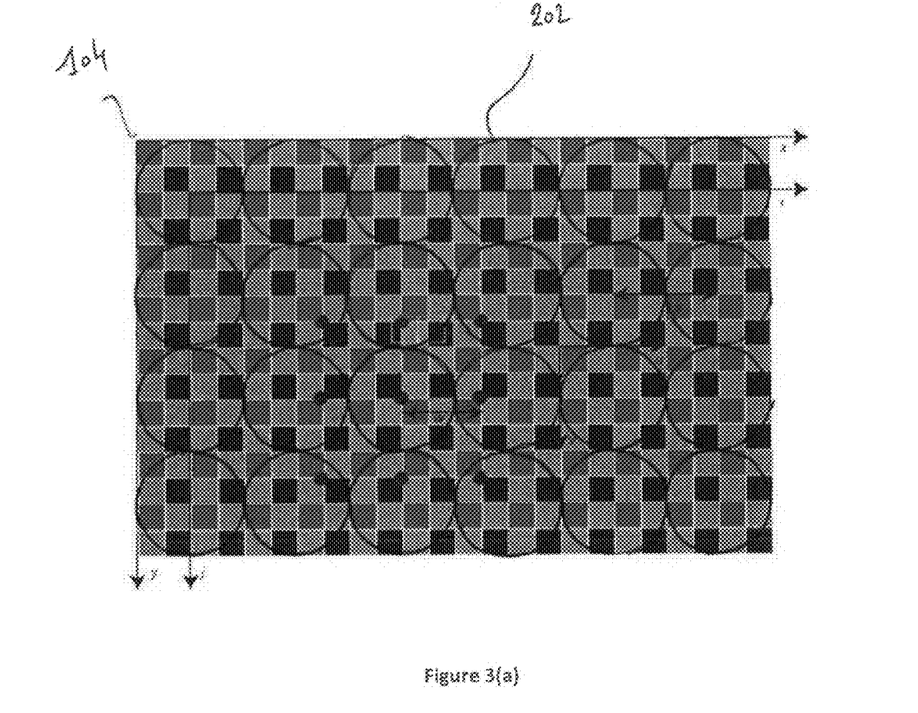
FIG. 3(a) presents a Color-Filter-Array (positioned on an image sensor) which is commonly used to sample various colors with pixels performing a single measure.
Figure 3B:
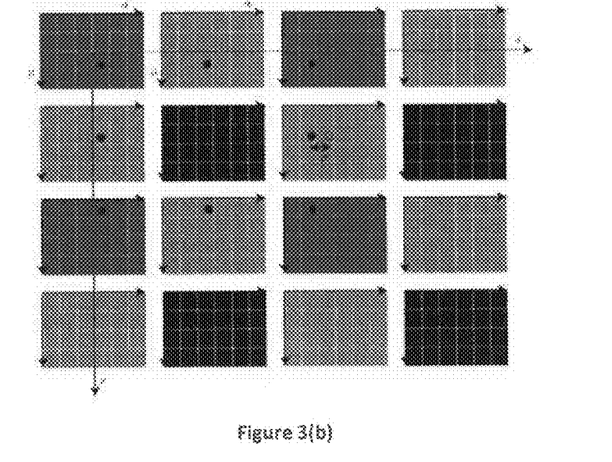
FIG. 3(b) presents sub-aperture images obtained from the micro-images from FIG. 3(a)

However, for a plenoptic camera, with a Color Filter array comprising the repetition of a Bayer pattern represented by a matrix of dimension M×M, and in the case that the size of the diameter of the micro-images (noted asp) is equal to k×M (i.e. k times M), where k is an integer, then it is not necessary to apply a color demosaicing process when obtaining a refocused image. Indeed, as detailed in FIG. 3(*b*), in this configuration, the sub-apertures images obtained from such plenoptic camera are mono-chromatic, and as the refocusing process comprises the adding of these sub-apertures images, there is no need to perform a demosaicing. The refocusing can be viewed as a demosaicing less operation.

Figure 4A:
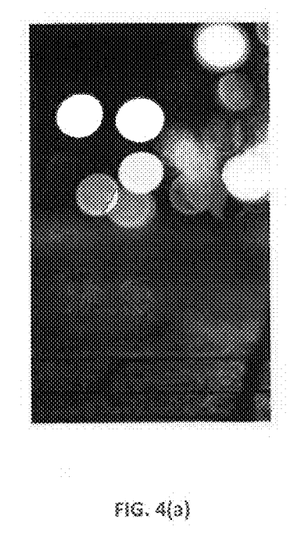
FIG. 4(a) illustrates a standard picture showing in focus part (bottom) and strongly de-focused light sources (top)
Figure 4B:
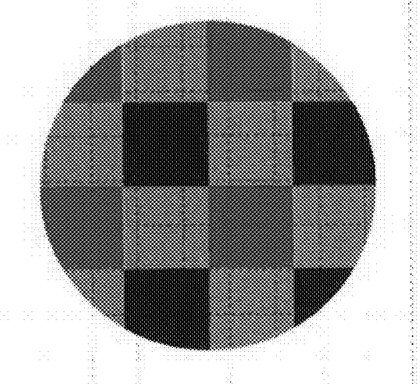
FIG. 4(b) presents what appears at the level of strongly de-focused light sources when refocusing is performed.

However, this architecture for a plenoptic camera has a drawback: the quality of bokeh in refocused images obtained from light field data acquired by such plenoptic camera is bad (due to the presence of color artifacts), especially during a refocusing process on other part of the image. These color artifacts are very difficult to correct, and occur each time some objects are observed out-of-focus by the main lens of a plenoptic camera. More precisely, a bokeh corresponding to a white circle form of a white light source point could display the Bayer pattern when refocusing, instead of keeping the same homogeneous color (see FIGS. 4(*a*) and 4(*b*) of the present document). Another issue induced by such architecture is that when a change of viewpoint in images (especially in the extreme viewpoints) is done, as the sub-aperture images are monochromatic, it will not be possible to obtain a good demosaiced image.

For correcting such issue, one solution consists in applying a color filter array (based on a Bayer pattern) directly on the micro-lens of a plenoptic camera instead of positioning it on the image sensor itself. Such technique is briefly described in FIG. 3 of the present document, or in the FIG. 2 of document US 2015/0215593. However, there is a need for a solution that does not need to change the position of a CFA from the image sensor to the micro-lens array.

One skilled in the art, trying to keep the CFA positioned on the image sensor, would have breakdown the regularity of the CFA by using random patterns as mentioned in paragraph [0128] of document US 2014/0146201.

However, there is a need to determine which pattern configuration is well fitted for solving the previous mentioned problem.

SUMMARY OF THE DISCLOSURE

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present disclosure is directed to a plenoptic camera comprising a color filter array positioned on an image sensor comprising an array of pixels, said color filter array comprising a first filter comprising a set of unit elements, each unit element covering M×M pixels of said image sensor, with M an integer such that M≥2, said plenoptic camera further comprising a set of micro-lens, each micro-lens delivering a micro-lens image on said image sensor with a diameter equal to p=k×M (i.e. k times M), with k being an integer greater than or equal to two. The first filter is remarkable in that said set of unit elements comprises an initialization unit element being associated with a matrix $$(c_{m,n})_{\substack{0 \leq m < M \\ 0 \leq n < M}}$$

indicating a filter repartition (or pattern), where each coefficient $c_{m,n}$ is associated with a filter value, and in that the other unit elements are associated with matrixes with coefficients set to $c_{(x+i) mod M, (y+j) mod M}$, for corresponding pixel (x,y,i,j) on said image sensor, where indexes x, y relate to indexation of a pixel in said image sensor, and indexes i,j relate to indexation of a micro-lens in said set of micro-lens (also named a micro-lens array).

In a preferred embodiment, said first filter is a color filter.

In a preferred embodiment, said initialization unit element is an extended Bayer filter pattern.

In a preferred embodiment, the plenoptic camera is remarkable in that M=2 and said initialization unit element is a Bayer filter pattern.

In a preferred embodiment, the plenoptic camera is remarkable in that M=2 and said initialization unit element is a RGBE (red, green, blue and emerald) filter pattern.

In a preferred embodiment, said color associated with a coefficient $c_{m,n}$ belongs to a group comprising cyan, yellow, green and magenta.

In a preferred embodiment, the plenoptic camera is remarkable in that M=2, and said initialization unit element is a CYYM (cyan, yellow, yellow and magenta) filter pattern.

In a preferred embodiment, the plenoptic camera is remarkable in that M=2, and said initialization unit element is a CYGM (cyan, yellow, green and magenta) filter pattern.

In a preferred embodiment, the plenoptic camera is remarkable in that said color filter array further comprises a second filter comprising another set of unit elements, each unit element of said another set covering pM×pM pixels of said image sensor, and being associated with polarization values or density values.

In a preferred embodiment, the plenoptic camera is remarkable in that said first filter is a polarization filter or a density filter.

In a preferred embodiment, the plenoptic camera is remarkable in that said color filter array further comprises a third filter comprising another set of unit elements, each unit element of said another set covering pM×pM pixels of said image sensor, and being associated with color values.

In a preferred embodiment, the plenoptic camera is remarkable in that wherein k≤4.

BRIEF DESCRIPTION OF THE DRAWINGS

The above and other aspects of the invention will become more apparent by the following detailed description of exemplary embodiments thereof with reference to the attached drawings in which.

DETAILED DESCRIPTION

Figure 1:
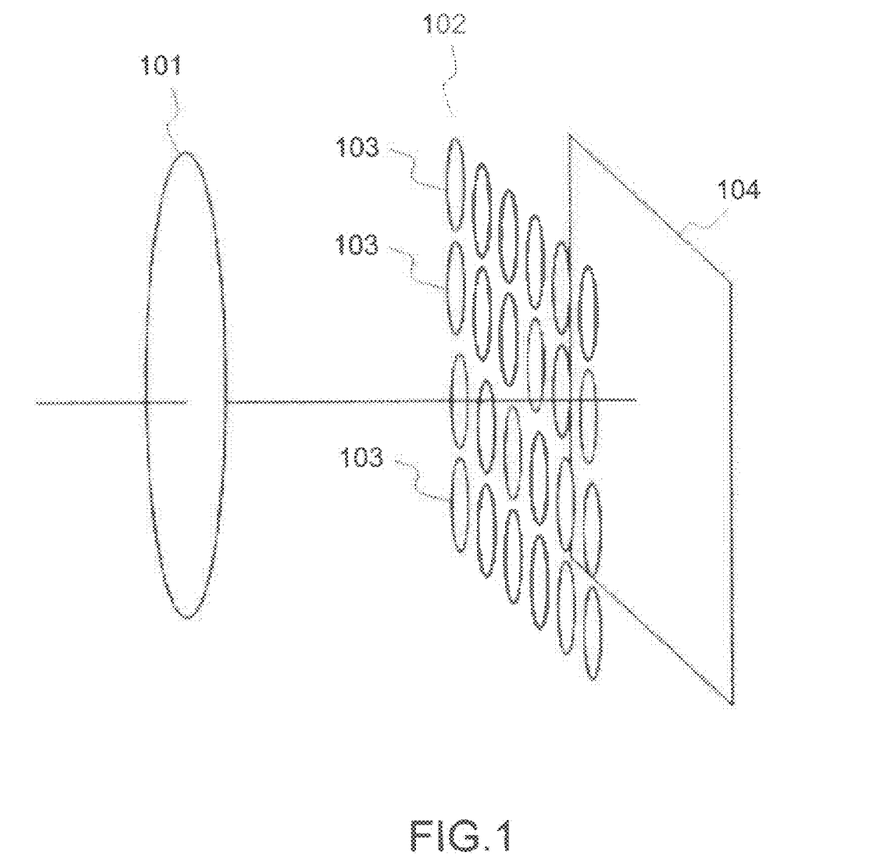
FIG. 1 present schematically the main components comprised in a plenoptic camera that enables the acquisition of light field data on which the present technique can be applied.

FIG. 1 present schematically the main components comprised in a plenoptic camera that enables the acquisition of light field data on which the present technique can be applied.

More precisely, a plenoptic camera comprises a main lens referenced 101, and an image sensor (i.e. an array of pixel sensors (for example a sensor based on CMOS technology)), referenced 104. Between the main lens 101 and the image sensor 104, a microlens array (i.e. a set of micro-lens) referenced 102, that comprises a set of micro lenses referenced 103, is positioned. It should be noted that optionally some spacers might be located between the micro-lens array around each lens and the image sensor to prevent light from one lens to overlap with the light of other lenses at the image sensor side. It should be noted that the main lens 101 can be a more complex optical system as the one depicted in FIG. 1 (as for example the optical system described in FIGS. 12 and 13 of document GB2488905) Hence, a plenoptic camera can be viewed as a conventional camera plus a micro-lens array set just in front of the image sensor as illustrated in FIG. 1. The light rays passing through a micro-lens cover a part of the image sensor that records the radiance of these light rays. The recording by this part of the image sensor defines a micro-lens image.

Figure 2:
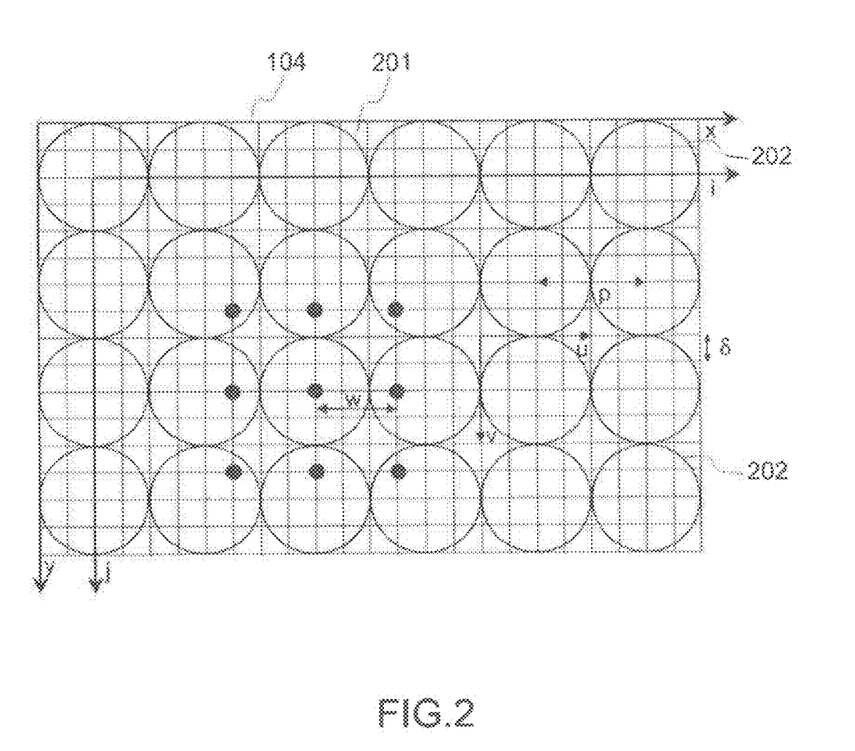
FIG. 2 present another view of the image sensor disclosed in FIG. 1.

FIG. 2 present what the image sensor 104 records. Indeed, in such view, it appears that the image sensor 104 comprises a set of pixels, referenced 201. The light rays passing through a micro-lens cover a number of pixels 201, and these pixels record the energy value of light rays that are incident/received.

Hence the image sensor 104 of a plenoptic camera records an image which comprises a collection of 2D small images (i.e. the micro-lens images referenced 202) arranged within a 2D image (which is also named a raw 4D light-field image). Indeed, each small image (i.e. the micro-lens images) is produced by a micro-lens (the micro-lens can be identified by coordinates (i,j) from the array of lens). Hence, the pixels of the light-field are associated with 4 coordinates (x,y,i,j). L(x,y,i,j) being the 4D light-field recorded by the image sensor illustrates the image which is recorded by the image sensor. Each micro-lens produces a micro-image represented by a circle (the shape of the small image depends on the shape of the micro-lenses which is typically circular). Pixel coordinates (in the image sensor) are labelled (x, y). p is the distance between 2 consecutive micro-images, p is not necessary an integer value in general (however, in the present disclosure, we consider that p is an integer. For example, in FIG. 2, we have p=4). Micro-lenses are chosen such that p is larger than a pixel size 6. Micro-lens images are referenced by their coordinate (i,j). Each micro-lens image samples the pupil of the main-lens with the (u, v) coordinate system. Some pixels might not receive any photons from any micro-lens especially if the shape of the micro-lenses is circular. In this case, the inter micro-lens space is masked out to prevent photons to pass outside from a micro-lens, resulting in some dark areas in the micro-images. If the micro-lenses have a square shape, no masking is needed). The center of a micro-lens image (i,j) is located on the image sensor at the coordinate $(x_{i,j}, y_{i,j})$. θ is the angle between the square lattice of pixel and the square lattice of micro-lenses, in FIG. 2 θ=0. Assuming the micro-lenses are arranged according to a regular square lattice, the $(x_{i,j}, y_{i,j})$ can be computed by the following equation considering $(x_{0,0}, y_{0,0})$ the pixel coordinate of the micro-lens image (0,0):

$$\begin{bmatrix} x_{i,j} \\ y_{i,j} \end{bmatrix} = p \begin{bmatrix} \cos\theta & -\sin\theta \\ \sin\theta & \cos\theta \end{bmatrix} \begin{bmatrix} i \\ j \end{bmatrix} + \begin{bmatrix} x_{0,0} \\ y_{0,0} \end{bmatrix}$$

FIG. 2 also illustrates that an object from the scene is visible on several contiguous micro-lens images (dark dots). The distance between two consecutive views of an object is w, this distance is named the replication distance. Hence, an object is visible on r consecutive micro-lens images with:

$$r = \left\lfloor \frac{p}{|p - w|} \right\rfloor$$

r is the number of consecutive micro-lens images in one dimension. An object is visible in $r^2$ micro-lens images. Depending on the shape of the micro-lens image, some of the $r^2$ views of the object might be invisible.

More details related to plenoptic camera can be found out in the Section 4 entitled "*Image formation of a Light field camera*" in the article entitled "*The Light Field Camera: Extended Depth of Field, Aliasing, and Superresolution*" by Tom E. Bishop and Paolo Favaro, published in the IEEE Transactions on Pattern Analysis and Machine Intelligence, Vol. 34, No 5, in May 2012.

It should be noted that micro-images can be re-organized into the so-called sub-aperture images. A sub-aperture images collects all 4D light-field pixels (i.e. the pixels that are positioned on the image sensor plane located behind the micro-lens) having the same (u, v) coordinates (the (u, v) coordinates correspond to coordinates on the main lens pupil).

In view of the FIG. 2, let (I,J) being the number of micro-lenses covering the image sensor, and $(N_x, N_y)$ the number of pixels of the image sensor. The number of sub-aperture images is equal to p×p. Each sub-aperture image have a size of $(I,J)=(N_x/p, N_y/p)$ pixels.

FIG. 3(a) presents a Color-Filter-Array (positioned on the image sensor 104) which is commonly used to sample various colors with pixels performing a single measure. The most common CFA pattern is the Bayer pattern made of 2 by 2 elements (i.e. the representation by the matrix B mentioned previously). For example, the FIG. 3(a) presents a CFA which is made of the repetition of the matrix B, and where the size of the diameter of the micro-images 202 is equal to p=4. FIG. 3(b) presents the sub-aperture images obtained from the micro-images 202. It appears that all the sub-aperture images are monochromatic.

Therefore, in that case, the refocusing is particularly interesting.

Indeed, usually, the refocusing of images can be done via the addition of sub-aperture images extracted/derived from the micro-images 204: refocused images can be computed by summing-up the sub-aperture images S(α, β) taking into consideration the disparity $\rho_{focus}$ for which objects at distance $z_{focus}$ are in focus. The sub-aperture pixels positioned at coordinates (α, β) of the sub-aperture image S(α, β, u, v) are projected to the pixel at coordinate (X,Y) according to the following equation:

$$\begin{bmatrix} X \\ Y \end{bmatrix} = s \begin{bmatrix} \alpha \\ \beta \end{bmatrix} + s\rho_{focus} \begin{bmatrix} u \\ v \end{bmatrix}$$

The 4D light field pixels S(α, β, u, v) are projected into the 2D refocused image. Preliminarily a refocused image R and a refocused image weight $R_{weight}$ are set to 0. The size of the refocused images $[N_X, N_Y]$ is set to s times the size of the sub-aperture images. The projection is performed by summing the projected pixels at the coordinate (X, Y) into the re-focused image. For each 4D light-field pixels projected, the refocused image weight is updated by adding 1 at the pixel coordinate (X, Y):

$$R(X,Y) += S(\alpha, \beta, u, v)$$

$$R_{weight}(X,Y) += 1$$

The refocused image weight records how many 4D light-field pixels have been projected per coordinate (X, Y). After projecting all 4D light-field pixels of S(α, β, u, v), the refused image R is divided by the refocused image weight $R_{weight}$. This last step harmonizes the number of pixels received per coordinate (X, Y).

Since the projected coordinates (X, Y) are not necessarily integer coordinates, it is better to use interpolation technique to map a non-integer pixel coordinate (X, Y) into the grid of the refocused image R and refocused image weight $R_{weight}$ (same interpolation function must be used when projecting into R and $R_{weight}$). Interpolation technique are commonly used, descriptions can be found in Bilinear Interpolation (http://en.wikipedia.org/wiki/Bilinear_interpolation).

Hence, when $\rho_{focus}=0$ (or equivalently $w_{focus}=\infty$) the re-focused image is obtained by superposing (i.e. adding) the sub-aperture images with no shifts. More generally, the use of a common CFA monted on the image sensor delivers de-mosaiced images whatever is the re-focusing parameter $\rho_{focus}$. But this design is not able to produce good image for objects which remain out-of-focus (bokeh is affected by strong color artefacts).

Such remark concerning the refocusing that does not need to perform a demosacing operation can be generalized to the use of a CFA pattern made of a matrix of M×M elements each element being labeled $c_{m,n}$ with $(m,n) \in [0,M[$ and with p (the diameter of the micro-images) equals to k·M, where k is an integer.

FIG. 4(a) illustrates a standard picture showing in focus part (bottom) and strongly de-focused light sources (top). The strongly de-focused light-sources are actually showing the pupil of the main-lens since each light-source is like a Dirac function. If a plenoptic camera with a Bayer CFA set on top of the pixels with p=4 then the re-focused image produced by the plenoptic camera will show/display content of FIG. 4(b).

It is worth mentioning that in this case the purpose of the plenoptic camera is not to render this light-source in focus. But at least this light-source observed with a strong de-focus should be observed without the Bayer pattern visible.

As mentioned previously, one solution to overcome such issue would be to put the color filter directly on the micro-lenses. However, it should be noted that the refocused image must be demosaiced for $\rho_{focus}=-M, 0, +M \ldots$. The proposed technique corresponds to a special CFA to be positioned on the image sensor, in such way that the re-focused images are fully de-mosaiced for $\rho_{focus}=-M, 0, +M \ldots$.

Indeed, the proposed technique relates to a CFA with a pattern of size M×M dedicated to a plenoptic camera with a micro-images having the size of p=kM (with θ=0° the angle between the micro-lens array and the pixel array and k any positive integer).

Let us consider a CFA pattern with $M^2$ colors $c_{m,n}$ with $(m,n) \in [0, M[$. The color applied on the pixel (x,y,i,j) is set to $c_{(x+i)modM,(y+j)modM}$. It results into a new CFA made of pM×pM covering the pixels. The original CFA is covering the p×p pixels, the other pixels belonging to the micro-lens (i,j) are covered with the original CFA but with "shuffled" colors.

The sub-aperture images are covered with the CFA of $M^2$ colors. But the starting colors of the sub-aperture image $S_{uv}$ is $c_{u,v}$ (and not $c_{0,0}$ for the common case where the original CFA is covering the pixels). This design makes re-focused images to be perfectly de-mosaiced for $\rho_{focus}=-M, 0, +M \ldots$. Also this new design is not affected by color artifacts for object observed out-of-focus.

Figure 5A:
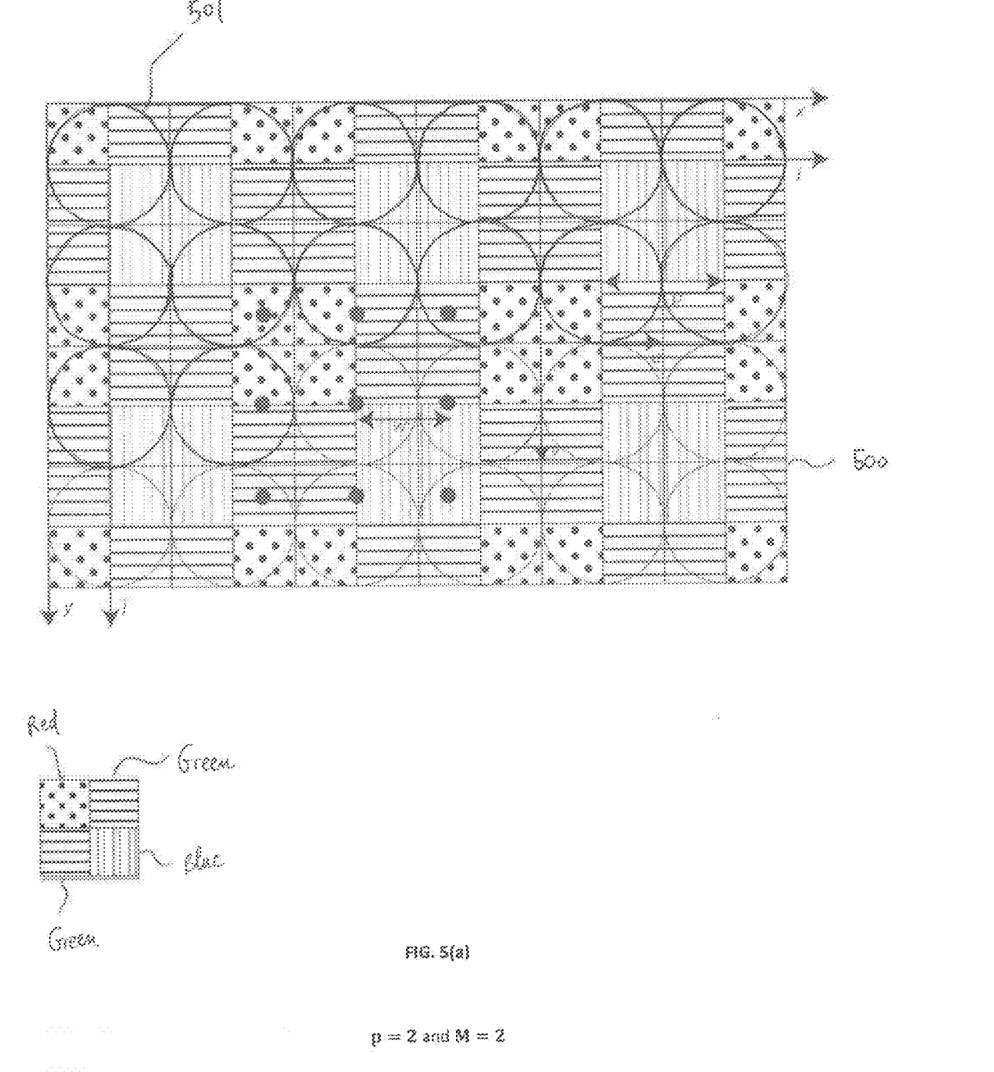
FIG. 5(a) presents a Color Filter Array according to one embodiment of the disclosure.

FIG. 5(a) presents a Color Filter Array with parameters p=M=2, positioned on an image sensor referenced 500, and where the micro-images are referenced 501. At the right top of the image sensor, the pattern is represented by a matrix $$C = (c_{ij})_{\substack{0 \le i \le 1 \\ 0 \le j \le 1}},$$

with 2 lines and 2 column, where $c_{01}=c_{10}=G$ (for Green), $c_{00}=R$ (for Red), and $c_{11}=B$ (for Blue). Then, instead of repeating this pattern along all the image sensor, shift color are performed as mentioned previously based on the equation $c_{(x+i)mod2,(y+j)mod2}$ for the pixel (x,y,i,j).

Figure 5B:
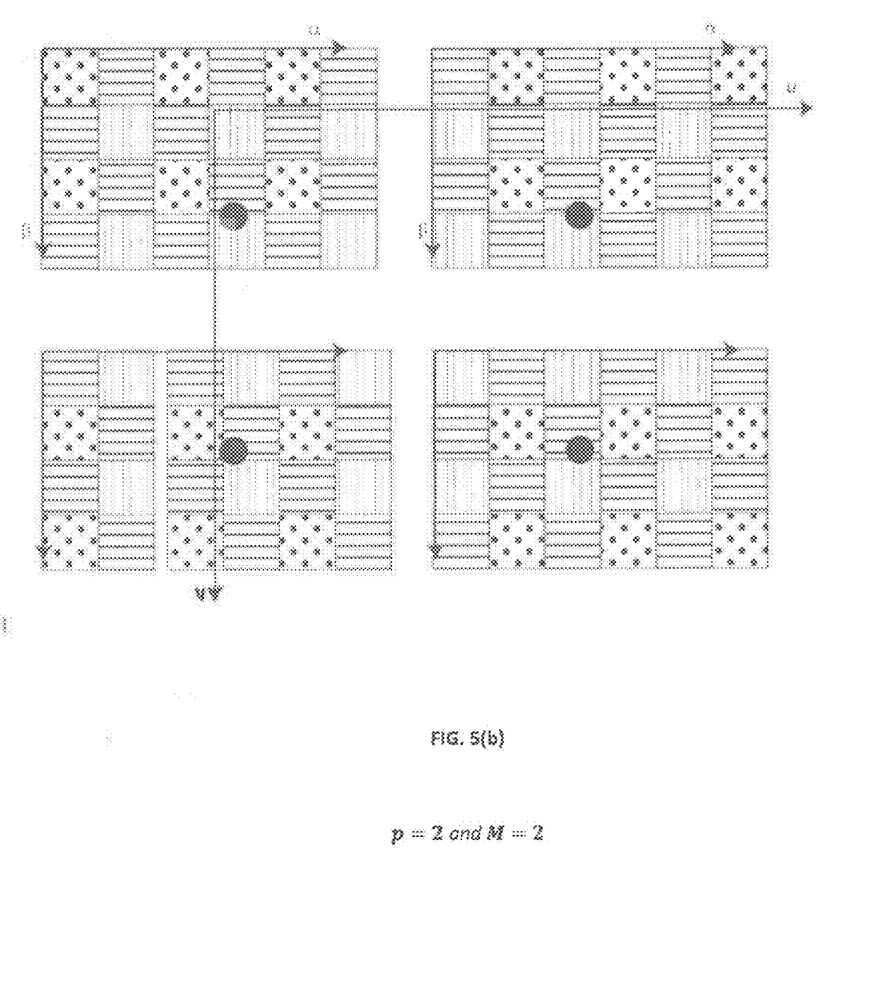
FIG. 5(b) presents sub-aperture images obtained from the micro-images from FIG. 5(a)

FIG. 5(b) presents sub-aperture images obtained from the processing of micro-lens images acquired via the configuration depicted in FIG. 5(a).

Figure 6A:
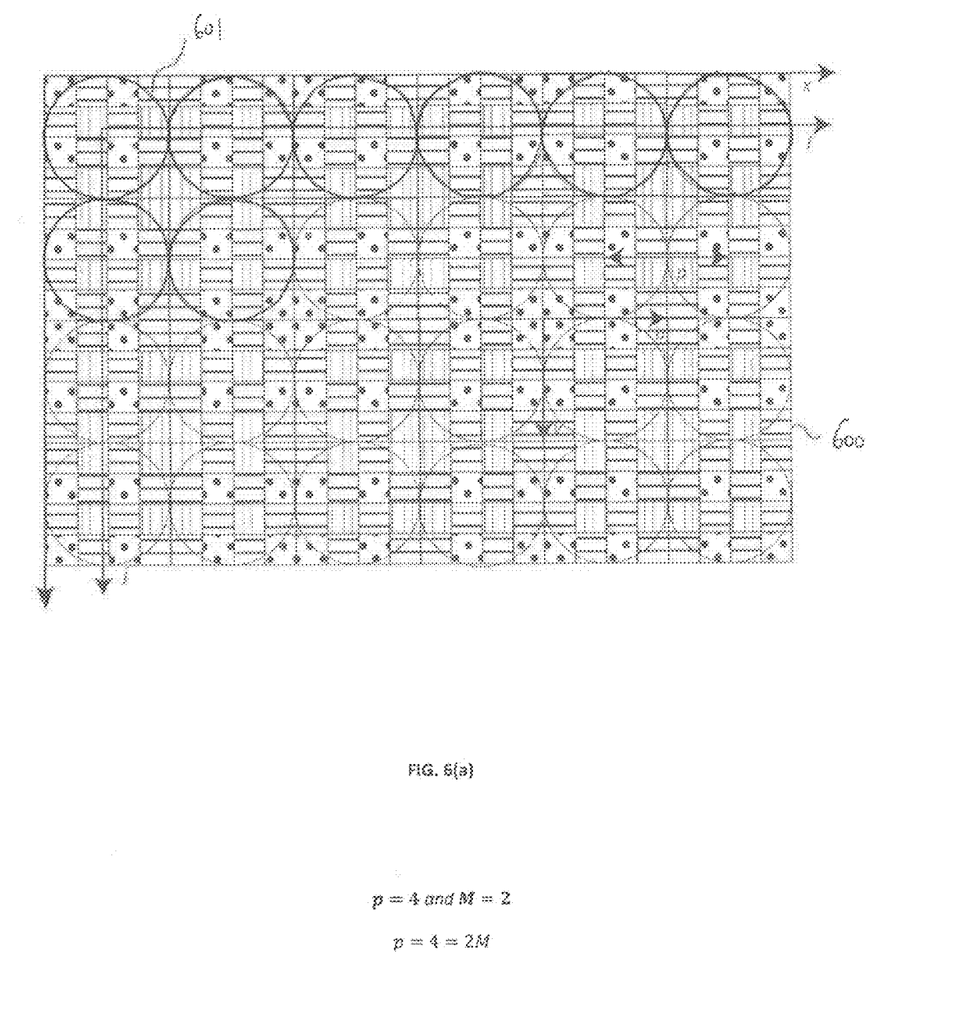
FIG. 6(a) presents a Color Filter Array according to another embodiment of the disclosure.

FIG. 6(a) presents a Color Filter Array with parameters p=4, and M=2 positioned on an image sensor referenced 600, and where the micro-images are referenced 601. At the right top of the image sensor, the pattern is represented by a matrix $$C = (c_{ij})_{\substack{0 \le i \le 1 \\ 0 \le j \le 1}},$$

with 2 lines and 2 column, where $c_{01}=c_{10}=G$ (for Green), $c_{00}=R$ (for Red), and $c_{11}=B$ (for Blue). Then, instead of repeating this pattern along all the image sensor, shift color are performed as mentioned previously based on the equation $c_{(x+i)mod4,(y+j)mod4}$ for the pixel (x,y,i,j).

Figure 6B:
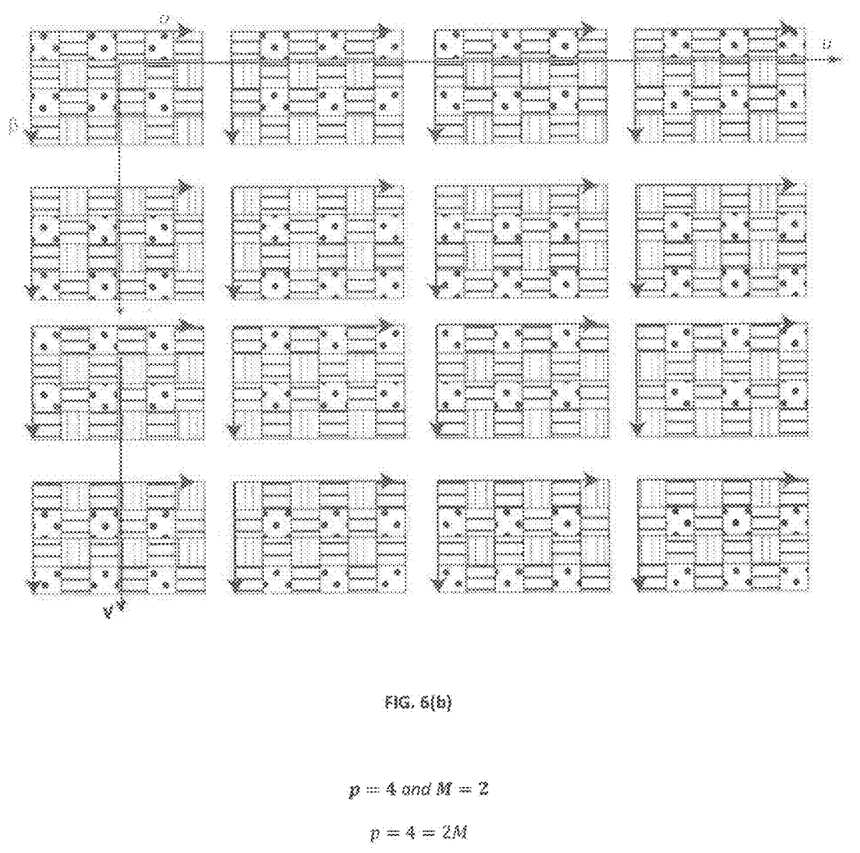
FIG. 6(b) presents sub-aperture images obtained from the micro-images from FIG. 6(a)

FIG. 6(b) presents sub-aperture images obtained from the processing of micro-lens images acquired via the configuration depicted in FIG. 6(a).

Figure 7:
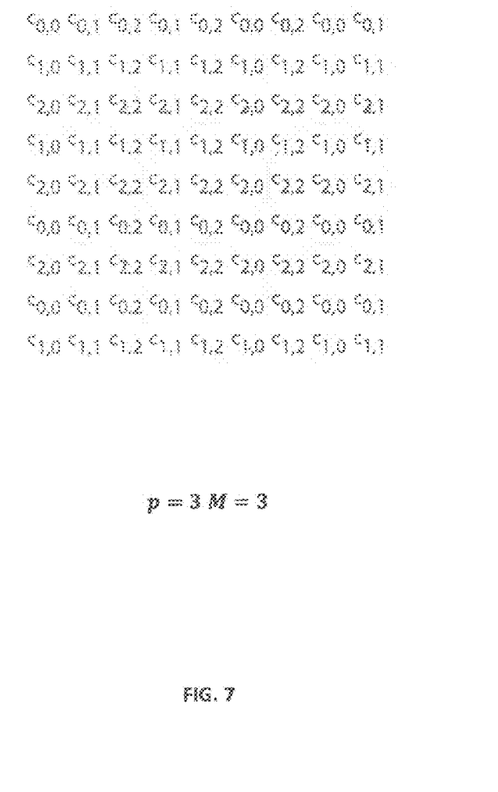
FIG. 7 presents a Color Filter Array according to another embodiment of the disclosure.

FIG. 7 illustrates how a CFA defined with M=3 is replicated on pixels covered by M×M consecutive micro-lenses. Here again, shift color is performed as mentioned previously based on the equation $c_{(x+i)mod3,(y+j)mod3}$ for the pixel (x,y,i,j).

Figure 8A:
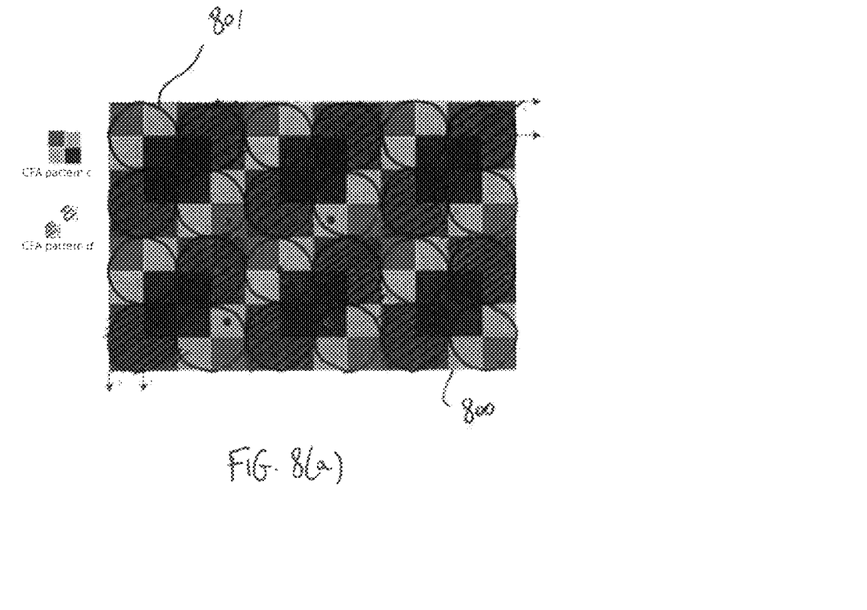
FIG. 8(a) presents a Color Filter Array according to another embodiment of the disclosure.

FIG. 8(a) presents a Color Filter Array with parameters p=2, and M=2, positioned on an image sensor referenced 800, and where the micro-images are referenced 801.

In such embodiment of the disclosure, it is proposed a CFA pattern made of pM×pM elements from an initial (or first) CFA pattern (or unit element from a first set) $c_{a,b}$ made of M×M elements using shuffling as mentioned previously, and another CFA pattern (or unit element from a second set) that covers the pixels below M×M micro-lens images.

In such embodiment a second CFA pattern $d_{a,b}$ made of M×M elements is used to be covered on the micro-lens image (i modM, j modM). For instance this second CFA pattern could be made of polarization filter with specific orientations, or density filters made of various density as for instance 1, 0.1, 0.01 and 0.001.

Hence, a given pixel (x,y,i,j) of the image sensor is covered by the combined colors from the c and d CFA patterns following: $c_{(x+i)modM,(y+j)modM} \times d_{i\,modM,j\,modM}$ where × denotes the combination between one element of c and one element of d. For instance the combination can be a superposition of the 2 elements.

Figure 8B:
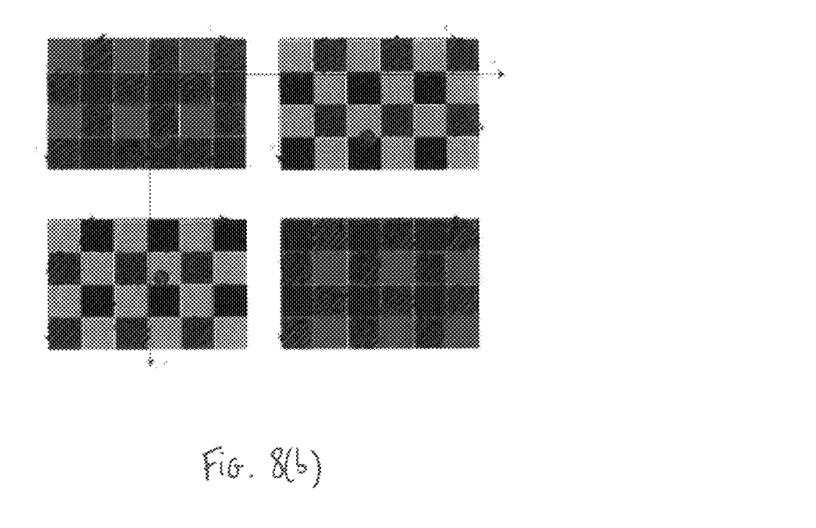
FIG. 8(b) presents sub-aperture images obtained from the micro-images from FIG. 6(a)

The FIG. 8(a) presents such embodiment where the first CFA pattern is made of the common Bayer pattern, and the second CFA pattern is made of a 2 transparent elements, and 2 element with a neutral density of 10%. This second CFA pattern is defined to capture High Dynamic Range image. The FIG. 8(b) presents the sub-aperture images obtained from the configuration depicted in FIG. 8(a). One notices that the sub-aperture pixels are covered by the regular second CFA pattern. The advantage of the combination of a first shuffled CFA pattern and a second CFA pattern is to capture a Light-Field with extended filters with partial de-mosaicing.

One advantage of this embodiment is to ensure that the RGB colors are demosaiced on the refocused image for any disparity $\rho=-M, 0, +M \ldots$. Moreover, HDR density are demosaiced for any disparity $\rho=-M, 0, +M \ldots$. For the casual refocusing (disparity $\rho=0$) such embodiment guarantees ideal color demosaicing with available HDR. Such embodiment is especially dedicated to camera used to doing natural photography.

In another embodiment of the disclosure (not presented in the Figures), the first and second CFA patterns are swapped. More precisely, the coefficients $c_{i,j}$ correspond to polarization values or density values. And the coefficients $d_{i\ modM, j\ modM}$ correspond to color values. The advantage of this settings it to guaranty that the HDR density are demosaiced on the refocus image for any disparity $\rho=-M, 0, +M$. RGB colors are demosaiced for any disparity $\rho=-M, 0, +M \ldots$. For the casual refocusing (with disparity $\rho=0$) this embodiment ensures a perfect HDR sampling with available color through de-mosaicing. Such embodiment is especially dedicated to industrial cameras that control a process with uncontrolled lighting.

Figure 9:
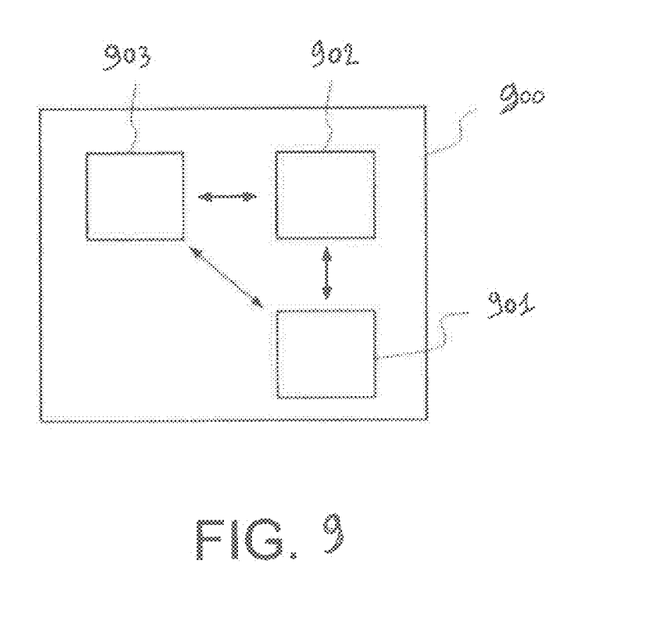
FIG. 9 presents an example of device that can perform processing and refocusing of sub-aperture images based on micro-lens images disclosed in the present document.

FIG. 9 presents an example of device that can be used to perform processing and refocusing of sub-aperture images based on micro-lens images disclosed in the present document.

Such device referenced 900 comprises a computing unit (for example a CPU, for "Central Processing Unit"), referenced 901, and one or more memory units (for example a RAM (for "Random Access Memory") block in which intermediate results can be stored temporarily during the execution of instructions a computer program, or a ROM block in which, among other things, computer programs are stored, or an EEPROM ("Electrically-Erasable Programmable Read-Only Memory") block, or a flash block) referenced 902. Computer programs are made of instructions that can be executed by the computing unit. Such device 900 can also comprise a dedicated unit, referenced 903, constituting an input-output interface to allow the device 900 to communicate with other devices. In particular, this dedicated unit 903 can be connected with an antenna (in order to perform communication without contacts), or with serial ports (to carry communications "contact"). It should be noted that the arrows in FIG. 9 signify that the linked unit can exchange data through buses for example together.

In an alternative embodiment, some or all of the steps of the method previously described, can be implemented in hardware in a programmable FPGA ("Field Programmable Gate Array") component or ASIC ("Application-Specific Integrated Circuit") component.

In one embodiment of the disclosure, the electronic device depicted in FIG. 9 can be comprised in a camera device that is configure to capture images (i.e. a sampling of a light field). These images are stored on one or more memory units. Hence, these images can be viewed as bit stream data (i.e. a sequence of bits). Obviously, a bit stream can also be converted on byte stream and vice versa.

The invention claimed is:

1. Plenoptic camera comprising a color filter array positioned on a an image sensor comprising an array of pixels, said color filter array comprising a first filter comprising a set of unit elements, each unit element covering M×M pixels of said image sensor, with M an integer such that M≥2, said plenoptic camera further comprising a set of micro-lens, each micro-lens delivering a micro-lens image on said image sensor with a diameter equal to p=k×M, with k being an integer greater than or equal to two, wherein said set of unit elements comprises an initialization unit element being associated with a matrix $$(c_{m,n})_{\substack{0 \leq m < M \\ 0 \leq n < M}}$$

indicating a filter pattern, where each coefficient $c_{m,n}$ is associated with a filter value, and in that the other unit elements are associated with matrixes with coefficients set to $c_{(x+i)modM,(y+j)modM}$, for corresponding pixel (x,y,i,j) on said image sensor, where indexes x,y relate to indexation of a pixel in said image sensor, and indexes i,j relate to indexation of a micro-lens in said set of micro-lens.

2. Plenoptic camera, according to claim 1, wherein said first filter is a color filter.

3. Plenoptic camera, according to claim 2, wherein said initialization unit element is an extended Bayer filter pattern.

4. Plenoptic camera, according to claim 3, wherein M=2 and said initialization unit element is a Bayer filter pattern.

5. Plenoptic camera, according to claim 3, wherein M=2 and said initialization unit element is a RGBE (red, green, blue and emerald) filter pattern.

6. Plenoptic camera, according to claim 2, wherein said color associated with a coefficient $c_{m,n}$ belongs to a group comprising cyan, yellow, green and magenta.

7. Plenoptic camera according to claim 6, wherein M=2, and said initialization unit element is a CYYM (cyan, yellow, yellow and magenta) filter pattern.

8. Plenoptic camera, according to claim 6, wherein M=2, and said initialization unit element is a CYGM (cyan, yellow, green and magenta) filter pattern.

9. Plenoptic camera according to claim 2, wherein said color filter array further comprises a second filter comprising another set of unit elements, each unit element of said another set covering pM×pM pixels of said image sensor, and being associated with polarization values or density values.

10. Plenoptic camera, according to claim 1, wherein said first filter is a polarization filter or a density filter.

11. Plenoptic camera according to claim 10, wherein said color filter array further comprises a third filter comprising another set of unit elements, each unit element of said another set covering pM×pM pixels of said image sensor, and being associated with color values.

12. Plenoptic camera, according to claim 1, wherein k≤4.

* * * * *